US011942254B2

(12) United States Patent
Daszkiewicz et al.

(10) Patent No.: US 11,942,254 B2
(45) Date of Patent: Mar. 26, 2024

(54) TRANSFORMER INSULATION MODIFICATION

(71) Applicant: HITACHI ENERGY LTD, Zürich (CH)

(72) Inventors: Robert Daszkiewicz, Lodz (PL); Pawel Klys, Lodz (PL); Alberto Prieto, Codoba (ES)

(73) Assignee: HITACHI ENERGY LTD, Zürich (CH)

( * ) Notice: Subject to any disclaimer, the term of this patent is extended or adjusted under 35 U.S.C. 154(b) by 88 days.

(21) Appl. No.: 17/331,706

(22) Filed: May 27, 2021

(65) Prior Publication Data

US 2021/0375524 A1 Dec. 2, 2021

(30) Foreign Application Priority Data

May 27, 2020 (EP) .................................... 20176908

(51) Int. Cl.
*H01F 27/32* (2006.01)
*H01F 27/02* (2006.01)
*H01F 27/28* (2006.01)

(52) U.S. Cl.
CPC ............. *H01F 27/28* (2013.01); *H01F 27/02* (2013.01); *H01F 27/32* (2013.01)

(58) Field of Classification Search
CPC .......... H01F 27/28; H01F 27/02; H01F 27/12; H01F 27/245; H01F 30/12; H01F 27/324
See application file for complete search history.

(56) References Cited

U.S. PATENT DOCUMENTS 3,774,135 A 11/1973 Kashima
4,673,907 A * 6/1987 Lee ....................... H01F 27/324 336/197
4,837,543 A * 6/1989 Humen ................... H01F 27/02 336/92
5,383,266 A * 1/1995 Soter ................... H01F 41/0233 29/609

(Continued)

FOREIGN PATENT DOCUMENTS

CN 2052936 U * 2/1990
CN 2504743 Y 8/2002

(Continued)

OTHER PUBLICATIONS

European Extended Search Report dated Nov. 4, 2020 for European Patent Application No. 20176908.0, 9 pages.

*Primary Examiner* — Tuyen T Nguyen
(74) *Attorney, Agent, or Firm* — Sage Patent Group

(57) ABSTRACT

A three-phase transformer including a transformer housing, a shell-form five-limb transformer core wherein main limbs include two outer main limbs and a middle main limb, three coil arrangements including two outer coil arrangements each arranged around a respective one of the outer main limbs, and a middle coil arrangement arranged around the middle main limb. The outer coil arrangements have an inter-coil insulation configured to electrically insulate the coil arrangements from the transformer housing and from the respective other ones of the coil arrangements, and wherein no inter-coil insulation is provided to the middle coil arrangement.

7 Claims, 3 Drawing Sheets

(56) References Cited

U.S. PATENT DOCUMENTS

| | | | | |
|---|---|---|---|---|
| 2001/0033216 | A1* | 10/2001 | Shirahata | H01F 30/12 336/5 |
| 2004/0150498 | A1 | 8/2004 | Marusinec et al. | |
| 2015/0109081 | A1* | 4/2015 | Patel | H01F 27/085 336/60 |

FOREIGN PATENT DOCUMENTS

| | | | | | |
|---|---|---|---|---|---|
| CN | 102460616 | A * | 5/2012 | | H01F 27/324 |
| FR | 2759488 | A1 * | 8/1998 | | H01F 27/367 |
| JP | H06231974 | A | 8/1994 | | |

* cited by examiner

TRANSFORMER INSULATION MODIFICATION

CROSS-REFERENCE TO RELATED APPLICATIONS

The present application claims benefit of priority to European Patent Application No. 20176908.0 filed May 27, 2020, and is assigned to the same assignee as the present application and is incorporated herein by reference.

FIELD

The disclosure relates to three-phase transformers, in particular, the disclosure relates to insulation of a "shell-type" three-phase transformer with five limbs.

BACKGROUND

A transformer is a passive electrical device that transfers electrical energy from one electrical circuit to another, or multiple circuits. A varying current in any coil of the transformer produces a varying magnetic flux in the transformer's core, which induces a varying electromotive force across any other coils wound around the same core.

Electrical energy can be transferred between separate coils without a metallic (conductive) connection between the two circuits. Transformers are most commonly used for increasing low AC voltages at high current (a step-up transformer) or decreasing high AC voltages at low current (a step-down transformer) in electric power applications, and for coupling the stages of signal processing circuits.

Closed-core transformers are constructed in "core-type" or "shell-type". When windings (coils) surround the core, the transformer is a "core type" transformer; when the coils/windings are surrounded by the core, the transformer is "shell-type". Shell type transformers may be predominantly used at higher voltage and power ratings. Shell type design tends to be preferred for extra-high voltage and higher MVA applications because, though more labor-intensive to manufacture, shell form transformers are characterized as having inherently better kVA-to-weight ratio, better short-circuit strength characteristics and higher immunity to transit damage.

In a transformer, insulation material needs to be provided e.g. between the windings of a coil (coil arrangement) or between coils and core. Layers of paper or polymer films may be inserted between layers of windings, and between primary and secondary windings. Large oil-filled power transformers use windings wrapped with insulating paper, which is impregnated with oil during assembly of the transformer.

Insulation material requires a sizeable portion of the total volume of the coil arrangement. Thus, for given available space, the volume requirement of the insulation is not available to the core or coil and thus restricts the potential for optimizing, e.g. the coil's magnetic resistance and thus the efficiency of the transformer.

It is an object of the present disclosure to provide a transformer, in particular a shell-type three-phase transformer, with a compact design and/or increased efficiency.

SUMMARY

In order to address the foregoing and other potential problems, embodiments of the present disclosure propose a three-phase transformer. The transformer comprising a transformer housing. The transformer further comprises a shell-form five-limb transformer core with three main limbs and two side limbs.

The main limbs comprise two outer main limbs and a middle main limb. The transformer further comprising three coil arrangements. The coil arrangements comprising two outer coil arrangements each arranged around a respective one of the outer main limbs and a middle coil arrangement arranged around the middle main limb. The outer coil arrangements may have an inter-coil insulation which is configured to electrically insulate the coil arrangements from the transformer housing and from the respective other ones of the coil arrangements and wherein no inter-coil insulation is provided to the middle coil arrangement.

BRIEF DESCRIPTION OF DRAWINGS

Embodiments of the present disclosure will be presented in the sense of examples and their advantages are explained in greater detail below, with reference to the accompanying drawings, wherein.

DETAILED DESCRIPTION OF EMBODIMENTS

Figure 1:
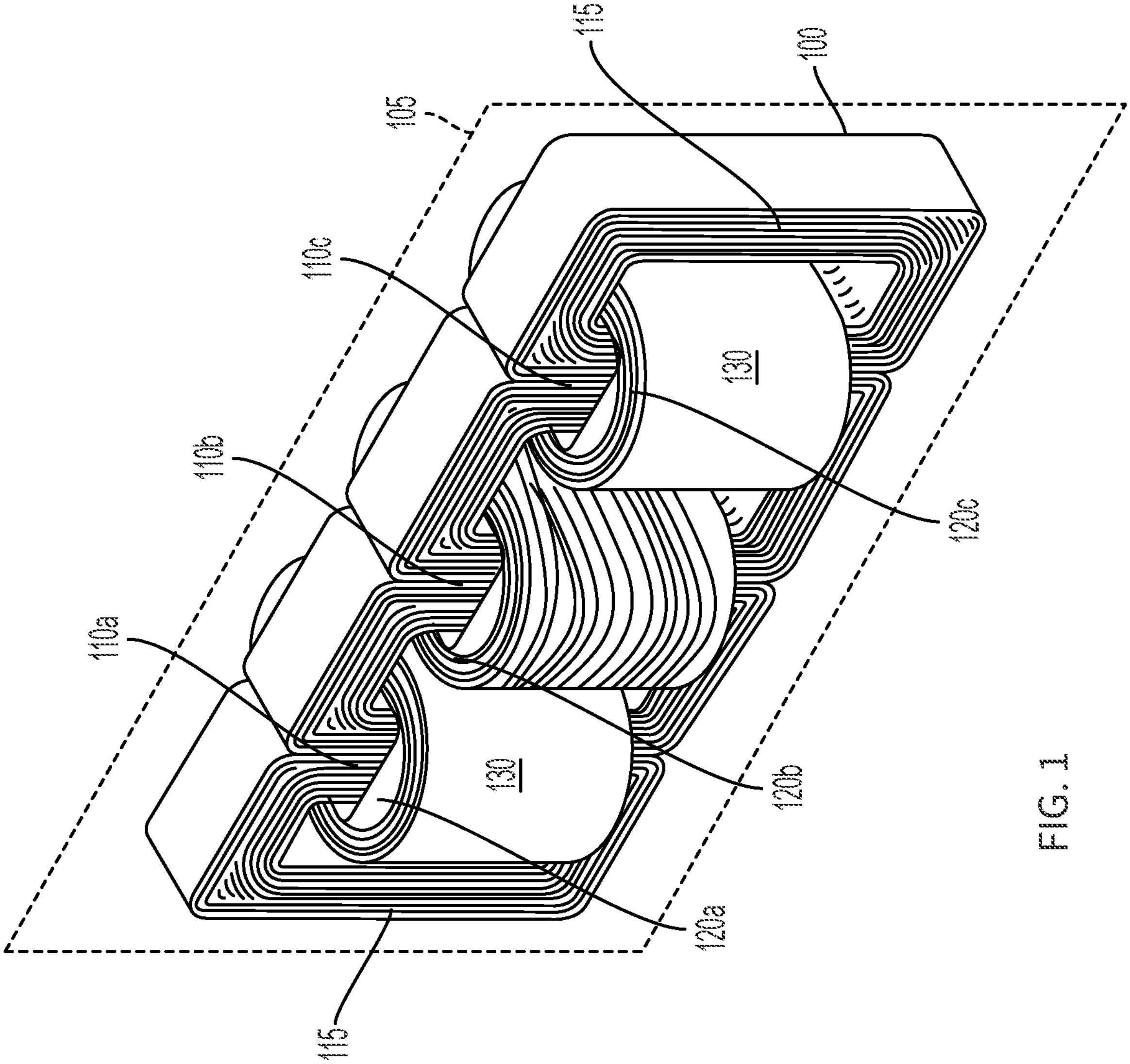
FIG. 1 shows a transformer according to embodiments of the disclosure.

Hereinafter, the principle and spirit of the present disclosure will be described with reference to the illustrative embodiments. It should be understood, all these embodiments are given merely for the skilled in the art to better understand and further practice the present disclosure, but not for limiting the scope of the present disclosure. For example, features illustrated or described as part of one embodiment may be used with another embodiment to yield still a further embodiment.

In the interest of clarity, not all features of an actual implementation are described in this specification. It will of course be appreciated that in the development of any such actual embodiment, numerous implementation-specific decisions should be made to achieve the developers specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The disclosed subject matter will now be described with reference to the attached figures. Various structures, systems and devices are schematically depicted in the drawings for purposes of explanation only and so as to not obscure the description with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art.

No special definition of a term or phrase, i.e. a definition that is different from the ordinary and customary meaning as understood by those skilled in the art, is intended to be implied by consistent usage of the term or phrase herein. To the extent that a term or phrase is intended to have a special meaning, i.e. a meaning other than that understood by skilled artisans, such a special definition will be expressly set forth in the specification in a definitional manner that directly and unequivocally provides the special definition for the term or phrase. In particular a coil can also be designated as coil arrangement. A coil may comprise one or more windings.

Available transformer coils are generally built with an insulation that is arranged outside the coils to cover high-voltage (HV) windings. This insulation may be configured to take the whole test voltage. During assembly of the active parts of the transformer, additional insulation may be placed between coils and core is placed to close mechanical gaps.

One of the aspects of the present disclosure may be a reduction of "coil cover" insulation between coils and between coil and core to enable e.g. a reduction of material cost.

FIG. 1 shows a three-phase transformer according to embodiments of the present application.

Figure 2:
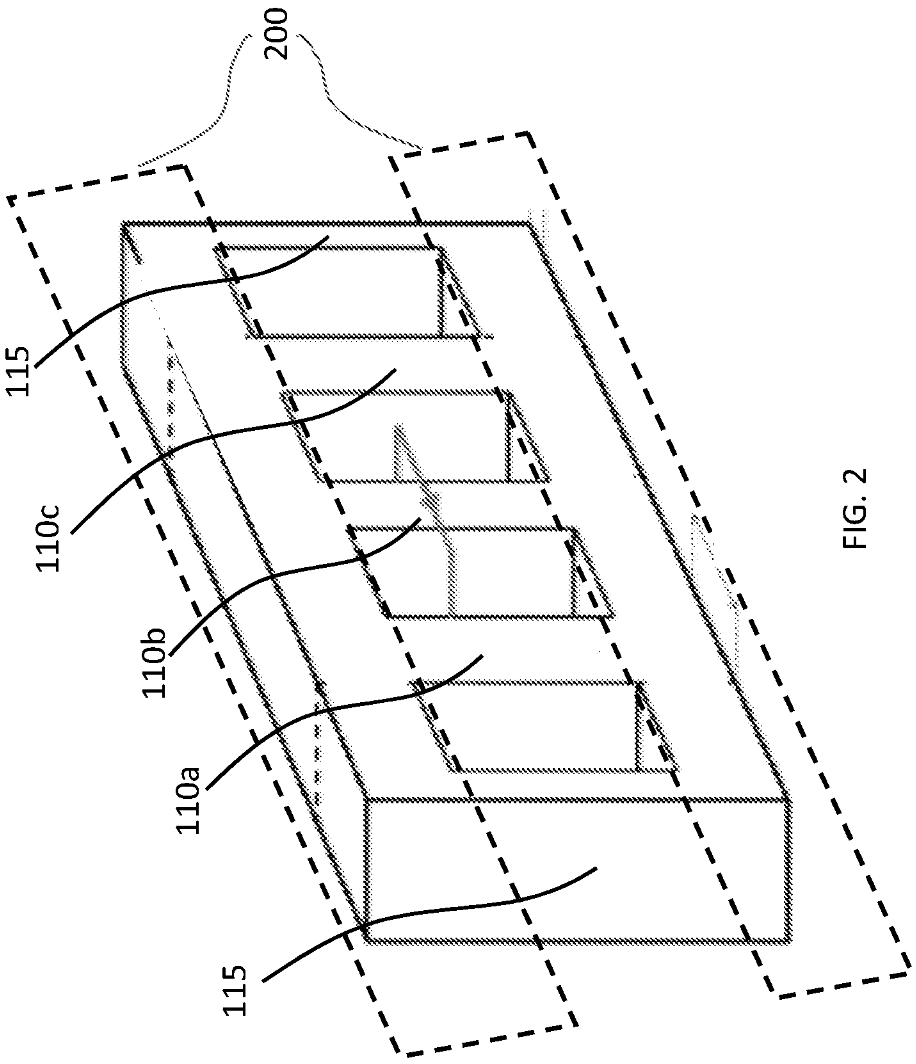
FIG. 2 shows a five-limb core.

A core 100 of the transformer is a five-limb core i.e. a shell-form core for a three-phase transformer as can be also seen in FIG. 2 (core shown without the coils). The five limbs 110*a,b,c* and 115 are substantially arranged in a plane. On their ends, the limbs 110*a, b, c* and side limbs 115 are connected via "yokes" 200 to form a closed magnetic circuit. The yokes 200 are the areas in FIG. 2, encircled with a dashed line.

The "inner" three limbs 110*a*, 110*b*, 110*c* of the core are the main limbs since on these main limbs the coil arrangements 120*a*, 120*b*, 120*c* are arranged.

Each of the coil arrangements 120*a*, 120*b*, 120*c* on one of the main limbs 110*a*, 110*b*, 110*c* is assigned to one of the three phases of a three-phase distribution net. Each of the coil arrangements may comprise high voltage and low voltage windings. Low voltage windings may be arranged on the limb as inner windings.

High-voltage windings may be arranged as outer windings, surrounding the inner low-voltage windings.

The outer high-voltage windings on a coil arrangement 120*a*, 120*b*, 120*c* can generate a high electric field strength with respect to its surrounding region. The closer the distance to the respective coil/high voltage winding, the higher the field strength and the higher the possibility for a flashover. A field strength gradient depends on the transformation ratio $N_H/N_L$ ($N_L$=number of windings on the low voltage side; $N_H$=number of windings on the high voltage side) and the insulation used to insulate the coils/windings.

The core 100 may comprise a metallic core material. The core 100 is connected to ground GND. Within core and coil assembly in transformers, insulation can be divided into two fundamental groups: minor insulation and major insulation. Minor insulation may be used between parts of individual coils or windings depending on construction. Major insulation separates the high-and low-voltage windings, and the windings to core 100. This does mostly concern the two coil arrangements 120*a*, 120*c*, arranged on limbs 110*a* and 110*c*, which are the limbs adjacent the middle main limb 110*b*.

To avoid a flashover between the coils 120*a*, 120*c* and the conducting material of grounded core 100, in particular between the side limbs 115 of the shell-form five-limb transformer core 100 which are close to the high voltage windings of coils/coil arrangements 120*a*, 120*c* on limbs 110*a* and 110*c*, the coils 120*a*, 120*c* are equipped with a coil insulation material 130 which may be referred to as "coil cover" or "inter-coil" insulation to mitigate an electric field strength between the grounded core material and the windings of the coils 120*a*, 120*c*.

However, in currently available transformers, all three coils 120*a, b, c* may be equipped with such a coil insulation 130. The inter-coil insulation 130 however has a certain material volume (thickness), dependent on the supported voltages of the transformer and the characteristics of the used materials.

The insulation 130 itself does not directly contribute to the electrical characteristics of the transformer. However, the volume of the insulation material may enlarge the volume of coil arrangement 120. That is, the coil 120, together with its coil insulation 130 has a specific volume and the core 100 has to be designed to take the coils and its insulation 130. In other words, the insulation may indirectly influence the geometrical measures (size) of core 100. On the other hand, the geometrical measures of a transformer core 100 are another characteristic of a transformer with respect to cost end effectivity.

In a transformer, for sufficient effectivity, it is generally of interest to make the magnetic resistance $$R_m = l/(\mu_0 \mu_r A) \quad (1)$$

of core 100 as small as possible to have a high magnetic flux. In equation (1), "l" represents the length of the magnetic circuit in meters; $\mu_0$ represents the permeability of vacuum; $\mu_r$ represents the relative magnetic permeability of the core material and "A" represents the cross-sectional area of the circuit in square meters ($m^2$).

That is, in a transformer it may be of high interest to minimize the magnetic circuit length "l" to limit no-load current that represents energy required for circuit magnetization and power losses in the circuit.

In an effort to improve the current transformer design and to increase an effectivity of a transformer and advantageously lowering costs, it is proposed to only equip coil arrangements 120*a* and 120*c* on core limbs 110*a* and 110*c* (see FIG. 1) with coil insulation 130. In other words, the coil arrangements which are in direct proximity to the side limbs 115 of grounded core 100 are equipped with coil cover/intercoil-insulation material 130 to mitigate the electrical field strength between outer HV windings of the coil arrangements 120*a*, 120*c* and the grounded limbs 115 to avoid flashovers.

The coil arrangement 120*b* on the middle main limb 110*b* of the five limbs comes only with an insulation of the windings or a solid insulation against the neighboring coils 120*a*, 120*c*, since the transformer is built into an oil-filled grounded metal housing 105 for cooling and shielding. Therefore, the lack of coil-cover/inter-coil insulation 130 on the coil arrangement 120*b*, arranged on the middle main limb 110*b* does not pose a risk of hazard to the environment.

The coil arrangement 120*b* on the middle main limb 110*b* may have a smaller construction volume without the insulation material 130 than the coil arrangements 120*a*, 120*c* on the limbs 110*a*, 110*c*.

Figures 3A, 3B:
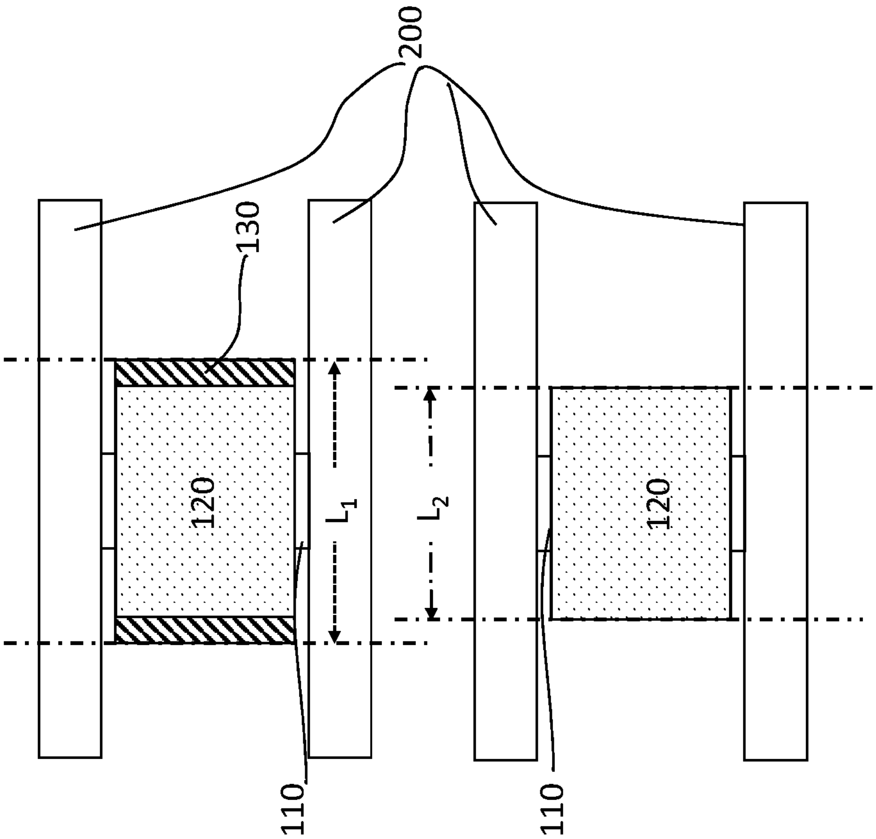
FIG. 3A is a sketch of a coil arrangement.
FIG. 3B sketches a coil arrangement according to embodiments of the disclosure.

FIG. 3A shows an available construction. The proportion seen in the FIGS. 3A and 3B are only for a better overview and do not show the proportions in a real transformer. Core 120 (this is in particular the coil arrangement 120*b* on the middle main limb 110*b*) is surrounded by coil cover insulation 130. $L_1$ symbolizes the width of the coil arrangement.

Below, in FIG. 3B, coil arrangement 120 is shown without coil cover. "$L_2$" therefore symbolizes the width of the coil without insulation 130.

As can be seen, $L_2$ is smaller than $L_1$. The magnetic length of the core may therefore be reduced by the difference $L_1-L_2$ Advantageously with this modification, the core 100 can be adapted to the size-reduced coil arrangement 120*b* on middle main limb 110*b*. The magnetic length l of the circuit can be designed shorter. This reduced magnetic length may result in a slightly reduced magnetic resistance (see equation (1)) and therefore in a higher effectivity and less thermal power loss which otherwise would have to be distributed/cooled. Waiving the inner coil insulation 130 partially, at least on the coil arrangement 120*b* on the main-middle limb 110*b* moreover saves cost and effort in manufacturing since only two coil arrangements have to be equipped with insulation 130.

A possible result of such modifications may be outlined by the following exemplary consideration:

A reduction of core steel may results in cost reduction of transformer, reduction of steel consumption with all environmental aspect of the reduction and may also be translated to a reduction of power loss, in particular NLL="no load loss reduction" No load losses include hysteresis and eddy current losses which may depend on:

Voltage (increase with voltage, as flux density reaches saturation), Frequency, Magnetic core design (steel properties, lamination thickness of the core metal sheets, mass).

Typically a transformer is continuously energized with various load. Load losses are a variable part, however the no-load loses may be constant. Hence, "no-load-losses" may be generated the whole year.

In an exemplary consideration, an installed transformer unit has about 3150 kVA. Further it is considered that this transformer may have "no-load-losses" of approximately 2.5 kW (NLL2500) which may be dependent on the manufacturer and its size.

A reduction of 1% of this NLL means about 25 W=0.025 kW. In one year (assumed with 8760 hours), the reduction is 0.025 kW×8760 h=219 kWh. A typical installation time for a transformer may be about 30 . . . 40 years. In 30 years, the energy savings are about 30*219=6570 kWh=6.57 GWh. This is however an exemplary consideration for only one single installed unit. The figures may be different for other installed units. The amount of installed transformers in the network brings correct scale.

Therefore, in sum, the waiving of the inter-coil insulation may save material cost, manufacturing cost, costs for core material (since the core size can be reduced) and, by improved magnetic behavior, effectiveness and loss behavior are improved.

A construction of a transformer taking into account the previously explained measures, in particular reduction of insulation between coils 120 and between coil 120 and core 100 may enable material cost reduction in a range of 1% of active part material cost. Additionally, the reduction of coil cover 130 may improve the thermal behavior since, in an oil-cooled transformer construction, the coil arrangements 120*a, b, c* may be cooled more effectively by the oil.

Therefore, in an embodiment of the present disclosure, a three-phase transformer is provided, taking into account the previously identified improvements. The transformer may comprise a housing (e.g., housing 105). The housing may further be filled with a fluid (e.g. transformer oil) as cooling or insulation medium.

The transformer may further comprise a shell-form five-limb transformer core 100. In "Shell-form" transformers, the coils/windings are surrounded by the core 100 (see FIG. 1).

The five limbs of the transformer core 100 can be divided into two groups of limbs: three main limbs 110*a*, 110*b*, 110*c* and two side limbs 115. The main limbs 110*a*, 110*b*, 110*c* may comprise two outer main limbs 110*a*, 110*c* and a middle/inner main limb 110*b*.

The transformer may further comprise three coil arrangements 120*a*, 120*b*, 120*c*. The three coil arrangements 120*a*, 120*b*, 120*c* may comprise two outer coil arrangements 120*a*, 120*c*, each of them arranged around a respective one of the outer main limbs 110*a*, 110*c*, and a middle coil arrangement 120*b* arranged on/around the middle/inner main limb 110*b*.

The outer coil arrangements 120*a*, 120*c* may be provided with a coil-cover/inter-coil insulation 130. The coil cover 130 may be configured to electrically insulate the coil arrangements 120*a*, 120*c* from the transformer housing and from the respective other ones of the coil arrangements 120*b*. The coil cover 130 may in particular be configured to insulate the HV side (HV-windings) of coil arrangements 120*a* and 120*c* from the grounded core 100, in particular to insulate the side limbs 115 from the high-voltage windings on coil arrangements 120*a*, 120*c*. The coil arrangement 120*b* on the middle main limb 110*b* is not provided with coil-cover/inter-coil insulation 130. This measure may decrease the construction volume of the coil arrangement 120*b* and may therefore enable to reduce the size (magnetical length) of the core 100.

In a further embodiment of the present disclosure, the coil arrangements 120*a*, 120*b*, 120*c* may each comprise at least one primary coil and one or more secondary coils. The primary coil may be the low voltage (LV) coil and the secondary coil may be the high-voltage (HV) coil. The high-voltage coil may substantially be arranged on the outside of coil arrangement 120*a*, 120*b*, 120*c*.

In yet a further embodiment of the present disclosure, a solid insulation material, e.g. in form of sheets, may be arranged in a free space between the coil arrangements 120*a, b, c* and/or between the coil arrangements 120 and the side limbs 115.

When mechanical material is arranged between coils 120*a, b, c* and/or between coils 120*a, b, c* and core 100, coil cover may be further reduced or may be completely removed. In particular, insulation material may be provided only in the area where high-field strengths may cause flashovers. This may further provide possibilities of coil cover reduction. For example, in critical area between limbs 115 of grounded core 100 and coil arrangements 120*a, c*, only sheet insulation material may be provided so that coil cover on these coil arrangements may be completely omitted or may be at least reduced in its amount. This may also provide further possibility to reduce core size and core-losses.

In summary of the previous disclosure, a three-phase transformer, in particular a transformer for high-power, in shell-design with five limbs is provided. To improve electrical and thermal behavior, the core size may be reduced by decreasing the volume of the coil arrangement 120 which is arranged on the middle limb. The core 100 can be built smaller which results in using less core material and reduces the magnetic length. This results in higher efficiency of the transformer and lower power losses in the core, specifically the "No Load Losses" (NLL).

What is claimed is:

1. A three-phase transformer comprising:

a shell-form five-limb transformer core having three main limbs, a first side limb, and a second side limb, the main limbs comprising a first outer main limb, a second outer main limb, and a middle main limb; and three coil arrangements comprising a first outer coil arrangement arranged around the first outer main limb, a second outer coil arrangement arranged around the second outer main limb, and a middle coil arrangement arranged around the middle main limb, wherein the first outer coil arrangement includes a first coil cover insulation and the second outer coil arrangement includes a second coil cover insulation;

wherein the first coil cover insulation surrounds the first outer coil arrangement and the first outer main limb such that the first coil cover insulation separates the first outer coil arrangement from the first side limb to mitigate an electrical field strength between the first side limb and high voltage windings of the first outer coil arrangement, wherein the second coil cover insulation surrounds the second outer coil arrangement and the second outer main limb such that the second coil cover insulation separates the second outer coil arrangement from the second side limb to mitigate an electrical field strength between the second side limb and high voltage windings of the second outer coil arrangement, wherein each of the first and second coil cover insulation is configured to electrically insulate the coil arrangements from a transformer housing and the core and from the respective other ones of the coil arrangements, and wherein the middle coil arrangement is not surrounded by a coil cover insulation.

2. The transformer according to claim 1, wherein the coil arrangements each comprise at least one primary coil and one or more secondary coils.

3. The transformer according to claim 1, further comprising:

solid insulation material arranged in a free space between the coil arrangements.

4. The transformer according to claim 1, further comprising:

solid insulation material arranged between the coil arrangements and the side limbs.

5. The transformer according to claim 1, further comprising a transformer housing, wherein the transformer core and the coil arrangements are disposed in the transformer housing.

6. The transformer according to claim 1, wherein a magnetic length of the transformer core is reduced by a length equal to twice a thickness of the first coil cover insulation.

7. The transformer according to claim 1, wherein a magnetic length of the transformer core is reduced by a length equal to twice a thickness of the second coil cover insulation.

* * * * *